(12) United States Patent
Park et al.

(10) Patent No.: US 10,837,412 B2
(45) Date of Patent: Nov. 17, 2020

(54) ENGINE SYSTEM

(71) Applicants: Hyundai Motor Company, Seoul (KR); Kia Motors Corporation, Seoul (KR)

(72) Inventors: Yeongseop Park, Seoul (KR); Jong Il Park, Seoul (KR); Seungwoo Hong, Seoul (KR); Heechang Oh, Suwon-si (KR); Dong Hee Han, Seoul (KR); Hyungbok Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 49 days.

(21) Appl. No.: 16/206,565

(22) Filed: Nov. 30, 2018

(65) Prior Publication Data
US 2020/0088141 A1 Mar. 19, 2020

(30) Foreign Application Priority Data

Sep. 17, 2018 (KR) .................. 10-2018-0110969

(51) Int. Cl.
| | |
|---|---|
| *F02M 26/14* | (2016.01) |
| *F02M 26/65* | (2016.01) |
| *F02M 26/05* | (2016.01) |
| *F02M 26/44* | (2016.01) |
| *F02M 26/17* | (2016.01) |

(Continued)

(52) U.S. Cl.
CPC .......... *F02M 26/14* (2016.02); *F02B 29/0406* (2013.01); *F02M 26/05* (2016.02); *F02M 26/17* (2016.02); *F02M 26/44* (2016.02); *F02M 26/65* (2016.02); *F02M 2026/002* (2016.02)

(58) Field of Classification Search
CPC ........ F02M 26/14; F02M 26/05; F02M 26/17; F02M 26/44; F02M 26/65; F02M 2023/002; F02B 29/04; F02B 29/0406
USPC ............ 60/605.2; 123/568.11, 568.12, 568.2
See application file for complete search history.

(56) References Cited

U.S. PATENT DOCUMENTS

| | | | | |
|---|---|---|---|---|
| 4,142,492 A | * | 3/1979 | Kobayashi ............. | F02M 26/14 123/568.11 |
| 4,151,715 A | * | 5/1979 | Tachibana .............. | F02M 26/43 60/278 |

(Continued)

FOREIGN PATENT DOCUMENTS

| | | | |
|---|---|---|---|
| JP | 2005120888 A | * | 5/2005 |
| JP | 4229913 B2 | | 2/2009 |

(Continued)

*Primary Examiner* — Thai Ba Trieu
(74) *Attorney, Agent, or Firm* — Morgan, Lewis & Bockius LLP

(57) ABSTRACT

An engine system may include an engine including a plurality of combustion chambers for generating a driving force by combustion of fuel, an exhaust gas purification device mounted in an exhaust line through which exhaust gas discharged from the combustion chamber flows, an EGR gas collecting device configured for collecting a part of the exhaust gas from an exhaust manifold of the engine and supplying the exhaust gas to an intake manifold of the engine, and an EGR gas supply control valve provided between the EGR gas collecting device and the intake manifold and adapted to regulate a flow rate of EGR gas supplied to the intake manifold.

12 Claims, 10 Drawing Sheets

(51) Int. Cl.
*F02B 29/04* (2006.01)
*F02M 26/00* (2016.01)

(56) References Cited

U.S. PATENT DOCUMENTS

| | | | | |
|---|---|---|---|---|
| 5,203,311 A * | 4/1993 | Hitomi | ............... | F02M 26/05 60/605.2 |
| 5,209,191 A * | 5/1993 | Kopec | ............... | F02M 35/10078 123/184.45 |
| 5,746,189 A * | 5/1998 | Kuzuya | ............... | F02M 26/36 123/568.2 |
| 5,937,834 A * | 8/1999 | Oto | ............... | F02M 26/05 60/605.2 |
| 5,957,116 A * | 9/1999 | Haegele | ............... | F02M 35/10052 123/568.12 |
| 6,065,456 A * | 5/2000 | Miyoshi | ............... | F02M 26/20 123/568.2 |
| 6,138,649 A * | 10/2000 | Khair | ............... | F01N 3/031 123/559.2 |
| 6,230,696 B1 * | 5/2001 | Veit | ............... | F02D 13/0276 123/568.12 |
| 6,742,506 B1 * | 6/2004 | Grandin | ............... | F02M 26/42 123/568.12 |
| 6,918,251 B2 * | 7/2005 | Yanagisawa | ............... | F02M 26/23 60/605.2 |
| 6,966,310 B2 * | 11/2005 | Moren | ............... | F02M 26/40 123/568.18 |
| 8,161,747 B2 * | 4/2012 | Pierpont | ............... | F02M 26/43 60/605.2 |
| 8,776,768 B2 * | 7/2014 | Otsubo | ............... | F02M 26/44 123/568.11 |
| 8,991,369 B2 * | 3/2015 | Huelsmann | ............... | F02M 26/44 123/568.12 |
| 9,016,044 B2 * | 4/2015 | Mafrici | ............... | F02M 26/44 60/285 |
| 9,279,393 B2 * | 3/2016 | Boyer | ............... | F02M 26/43 |
| 9,488,134 B2 * | 11/2016 | Jun | ............... | F02B 29/0462 |
| 2013/0340728 A1 * | 12/2013 | Keating | ............... | F02M 26/44 123/568.11 |
| 2014/0116404 A1 * | 5/2014 | Piper | ............... | F02M 26/24 123/568.12 |
| 2014/0144413 A1 * | 5/2014 | Pierik | ............... | F02M 26/44 123/568.12 |
| 2016/0237960 A1 * | 8/2016 | Foege | ............... | F02B 29/04 |
| 2017/0241377 A1 * | 8/2017 | Ito | ............... | F02M 26/44 |

FOREIGN PATENT DOCUMENTS

| | | | |
|---|---|---|---|
| JP | 2010144700 A | * 7/2010 | |
| JP | 2011241723 A | * 12/2011 | |
| JP | 2012-127261 A | * 7/2012 | |
| KR | 2020031908 A | * 3/2020 | ............ F02M 26/65 |

\* cited by examiner

ENGINE SYSTEM

CROSS-REFERENCE TO RELATED APPLICATION

The present application claims priority to Korean Patent Application No. 10-2018-0110969 filed on Sep. 17, 2018, the entire contents of which is incorporated herein for all purposes by this reference.

BACKGROUND OF THE INVENTION

Field of the Invention

The present invention relates to an engine system. More particularly, the present invention relates to an engine system for supplying EGR gas to an engine using an exhaust pulsation generated when an exhaust valve of an engine is opened.

Description of Related Art

Generally, in most gasoline engines mounted on a vehicle, an exhaust gas recirculation (EGR) system is installed to cope with exhaust gas regulations.

The exhaust gas recirculation (EGR) system reduces the combustion temperature of the engine and reduces the amount of nitrogen oxides (NOx) generated by returning a part of the exhaust gas discharged from the engine to the intake apparatus of the cylinder.

An EGR valve and an EGR cooler are arranged so that the recirculated exhaust gas (EGR gas) is cooled to a set temperature and supplied to the intake manifold.

The existing EGR system supplies the EGR gas to the engine using the differential pressure generated between the intake system of the engine and the exhaust system. However, there is a problem that the EGR gas is not smoothly supplied to the engine in the operation region where the intake and exhaust pressure difference is not sufficiently formed.

Furthermore, when the length of the passage through which the EGR gas passes is long, the EGR gas control responsiveness is limited.

Therefore, it is required to develop an engine system in which EGR gas is smoothly supplied in all the operation regions and the EGR control responsiveness is improved.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine system for using the EGR gas in all driving region by supplying the EGR gas to the engine by use of the exhaust pulsation generated when the exhaust valve of the engine is opened.

Another object of the present invention is to improve the EGR responsiveness by greatly reducing the length of the EGR passage compared to the existing EGR system.

An engine system according to an exemplary embodiment of the present invention may include an engine including a plurality of combustion chambers for generating a driving force by combustion of fuel, an exhaust gas purification device mounted in an exhaust line through which exhaust gas discharged from the combustion chamber flows, an EGR collecting device configured for collecting a portion of the exhaust gas from an exhaust manifold of the engine and supplying the exhaust gas to an intake manifold of the engine, and an EGR supply control valve provided between the EGR gas collecting device and the intake manifold and adapted to regulate a flow rate of EGR gas supplied to the intake manifold.

The engine system according to an exemplary embodiment of the present invention may further include a turbocharger including a turbine mounted in an exhaust line upstream of the exhaust gas purifying apparatus and rotated by exhaust gas and a compressor mounted in the intake line and rotating in association with the turbine.

The engine system according to an exemplary embodiment of the present invention may further include an intercooler connected to the compressor and mounted in an intake line upstream of the intake manifold to cool the air compressed by the compressor, and a throttle valve connected to the intercooler and mounted at an inlet of the intake manifold to adjust an air amount supplied to the intake manifold.

The engine system according to an exemplary embodiment of the present invention may further include a plurality of EGR exhaust passages branched from a plurality of combustion chambers on the exhaust manifold side and coupled to an inlet of the EGR collecting device.

An inlet of the EGR collecting device may be provided with an EGR gas collecting device check valve which is opened or closed by a pressure difference between the intake manifold and the exhaust manifold.

The EGR gas collecting device check valve is opened when the exhaust pulsation occurs, and the EGR gas may be introduced into the EGR collecting device.

An EGR exhaust passage check valve which is opened or closed by a pressure difference between the intake manifold and the exhaust manifold may be provided at an inlet of the plurality of EGR exhaust passages.

The EGR exhaust passage check valve is opened when exhaust pulsation occurs, and EGR gas may be introduced into the EGR collecting device through the plurality of EGR exhaust passages.

A cam drive check valve synchronized with the cycle of the engine may be mounted on the exhaust manifold side thereof.

The cam drive check valve may include a hollow pipe extending in the longitudinal direction of the exhaust manifold.

At least one through hole penetrating the side wall of the hollow pipe may be formed in the cam drive check valve.

The cam drive check valve may be provided to open or close the inlet of the EGR collecting device by being rotated in synchronization with the camshaft as a cam timing chain and a belt are driven.

The cam drive check valve may be rotated to drive the cam timing chain and the belt so that when the exhaust pulsation occurs, the through hole communicates with the inlet of the EGR collecting device to allow the EGR gas to flow into the EGR collecting device.

The cam drive check valve may have a plurality of through holes passing through the hollow pipe corresponding to the EGR exhaust passages provided corresponding to the combustion chamber.

The plurality of through holes may be formed in order at intervals of 45° along the circumferential direction of the cam drive check valve.

The cam drive check valve may rotate to operate to communicate with one of the combustion chamber and the through hole which are the exhaust strokes of the combustion chamber, and through the EGR exhaust passages connected to the combustion chamber which is the exhaust stroke, the EGR gas may flow into the EGR collecting device.

According to an exemplary embodiment of the present invention, by supplying the EGR gas to the engine by use of the exhaust pulsation generated when the exhaust valve of the engine is opened, the EGR gas may be used in all the operating regions regardless of the differential pressure generated between the intake system of the engine and the exhaust system, so that the EGR rate and the fuel economy of the engine may be improved.

Furthermore, the length of the EGR passage compared to the existing EGR system is greatly reduced, and the EGR response may be improved.

Furthermore, it is possible to secure combustion stability by eliminating instability of engine combustion which may occur when EGR is applied.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
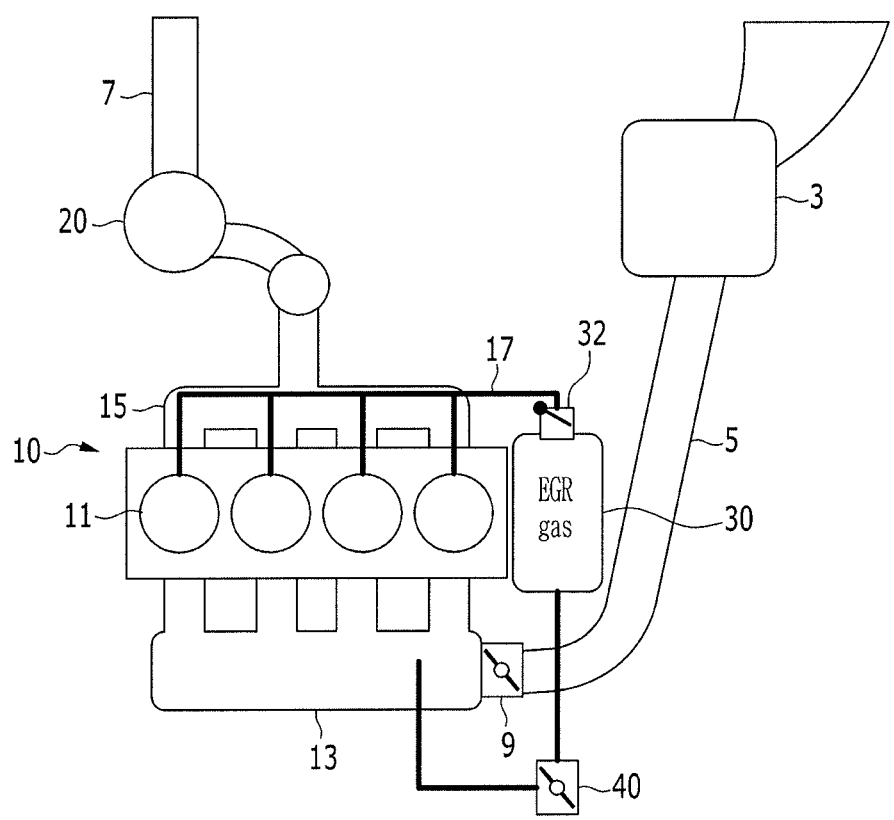
FIG. 1 is a schematic view showing an engine system according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present application will be described more fully with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Furthermore, same structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment of the present invention is not limited to a specific aspect of the illustrated region, and for example, includes modifications of an aspect by manufacturing.

Now, an engine system according to various exemplary embodiments of the present invention will be described with reference to FIG. 1 and FIG. 2.

Figure 2:
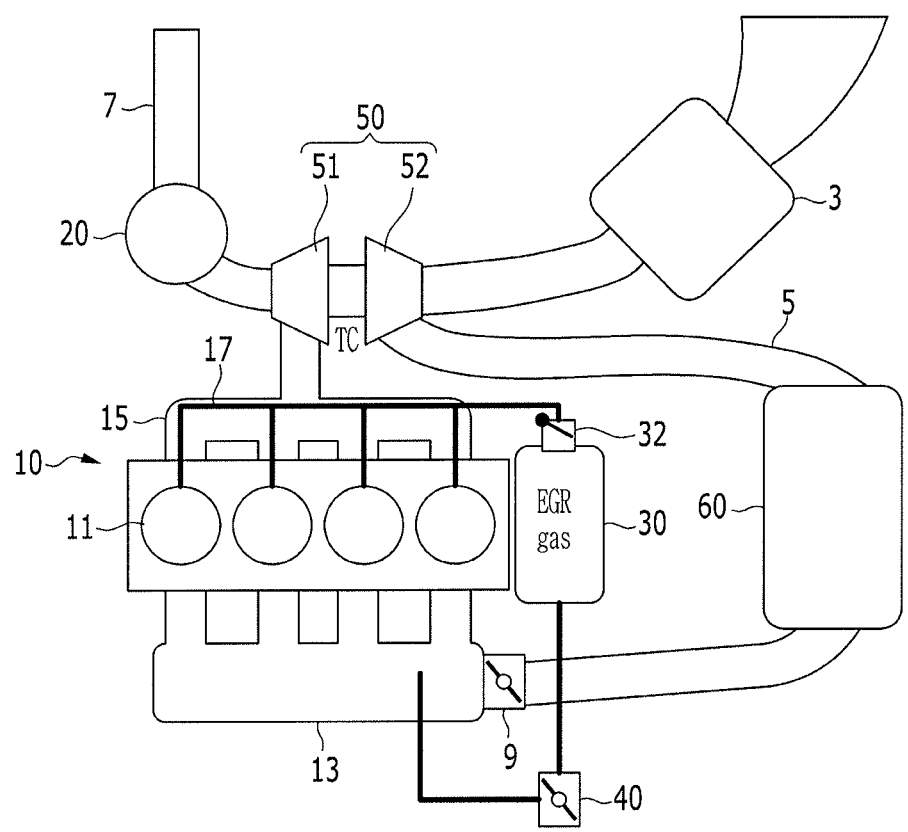
FIG. 2 is a schematic view showing an example in which a turbocharger is applied in the engine system according to the various exemplary embodiments of the present invention.

FIG. 1 is a schematic view showing an engine system according to various exemplary embodiments of the present invention, and FIG. 2 is a schematic view showing an example in which a turbocharger is applied in the engine system according to the various exemplary embodiments of the present invention.

Referring to FIG. 1, an engine system according to various exemplary embodiments of the present invention includes an engine 10, an exhaust gas purification device 20, an EGR collecting device 30, and an EGR gas supply control valve 40.

The engine 10 includes a plurality of combustion chambers 11 for generating a driving force by combustion of fuel. The engine 10 is provided with an intake line 5 through which an intake gas (outside air) supplied to the combustion chamber 11 flows and an exhaust line 7 through which exhaust gas discharged from the combustion chamber 11 flows.

An intake manifold 13 for distributing the intake gas to a plurality of combustion chambers 11 is mounted at an outlet of the intake line 5. An exhaust manifold 15 for collecting exhaust gas discharged from a plurality of combustion chambers 11 into an exhaust line 7 is mounted at an inlet of the exhaust line 7.

The intake gas supplied to the combustion chamber 11 of the engine 10 is supplied to the combustion chamber 11 of the engine 10 through the intake line 5 and the intake manifold 13 and the exhaust gas supplied from the combustion chamber 11 is expelled to the outside through the exhaust manifold 15 and the exhaust line 7. At the instant time, the exhaust line 7 is provided with an exhaust gas purifying device 20 for purifying the exhaust gas.

The exhaust gas purifying device 20 is provided in the exhaust line 7 and purifies various harmful substances contained in the exhaust gas discharged from the combustion chamber 11. The exhaust gas purifying device 20 may include a three-way catalyst for purifying nitrogen oxides. The three-way catalyst is a catalyst for removing carbon monoxide, nitrogen oxides and hydrocarbon compounds, which are harmful components of exhaust gas, and removing them. The three-way catalyst may be used of Pd alone, Pt/Rh, Pd/Rh or Pt/Pd/Rh.

The EGR collecting device 30 collects a portion of the exhaust gas from the exhaust manifold 15 of the engine 10 and re-supplies the exhaust gas to the intake manifold 13 of the engine 10.

A plurality of partitions may be mounted on the internal wall of the EGR collecting device 30, and a plurality of pins may be mounted on the external wall. The gas contact area of the inside and the outside of the EGR collecting device 30 is increased by the plurality of partition walls and the fin, so that the EGR gas may be efficiently cooled.

A plurality of EGR exhaust passages 17 are connected to the plurality of combustion chambers 11 on the exhaust manifold 15 side of the engine 10, and the plurality of EGR exhaust passages 17 join together and are connected to the inlet of the EGR collecting device 30. The exhaust gas exhausted from the plurality of combustion chambers 11 flows into the EGR collecting device 30 through the plurality of EGR exhaust passages 17.

An EGR gas collecting device check valve 32 which is opened or closed by a pressure difference between the intake manifold 13 and the exhaust manifold 15 may be provided at the inlet of the EGR collecting device 30. The EGR gas collecting device check valve 32 is opened when the exhaust pulsation of the engine 10 occurs and the EGR gas may be introduced into the EGR collecting device 30.

The EGR gas collecting device check valve 32 is operated by a control signal of a controller such as an ECU (Engine Control Unit) provided in the vehicle and may be controlled to be opened when the exhaust pulsation of the engine 10 occurs. The controller may be provided with one or more processors operating by the program set. The controller can control the EGR gas collecting device check valve 32 to be opened when the pressure difference between the intake manifold 13 and the exhaust manifold 15 becomes equal to or greater than a predetermined pressure value. Furthermore, when the pressure of the exhaust manifold 15 is higher than the pressure inside the EGR collecting device 30, the EGR gas collecting device check valve 32 may be controlled to be opened.

The EGR gas supply control valve 40 is provided between the EGR collecting device 30 and the intake manifold 13 and may be provided to regulate the flow rate of the EGR gas supplied to the intake manifold 13.

Meanwhile, as shown in FIG. 2, the engine system may further include a turbocharger 50 including a turbine 51 mounted in the exhaust line 7 upstream of the exhaust gas purifying device 20 and rotated by the exhaust gas and a compressor 52 mounted in the intake line 5 and rotated in conjunction with the turbine 51.

The turbocharger 50 compresses the intake gas flowing through the intake line 5 and supplies it to the combustion chamber 11.

Furthermore, the engine system may further include an intercooler 60 connected to the compressor 52 and mounted in an intake line 5 upstream of the intake manifold 13 to cool the air compressed by the compressor 52, and a throttle valve 9 connected to the intercooler 60 and mounted at an inlet of the intake manifold 13 to adjust an amount of air supplied to the intake manifold 13.

The throttle valve 9 is mounted at the point where the intake line 5 and the intake manifold 13 meet and can control the amount of intake air supplied to the intake manifold 13. The throttle valve 9 is operated by the control signal of the controller provided in the vehicle so that the amount of intake air supplied to the intake manifold 13 may be adjusted.

Meanwhile, an air cleaner 3 for filtering outside air flowing through the intake line 5 may be mounted on the intake line 5.

Figure 3:
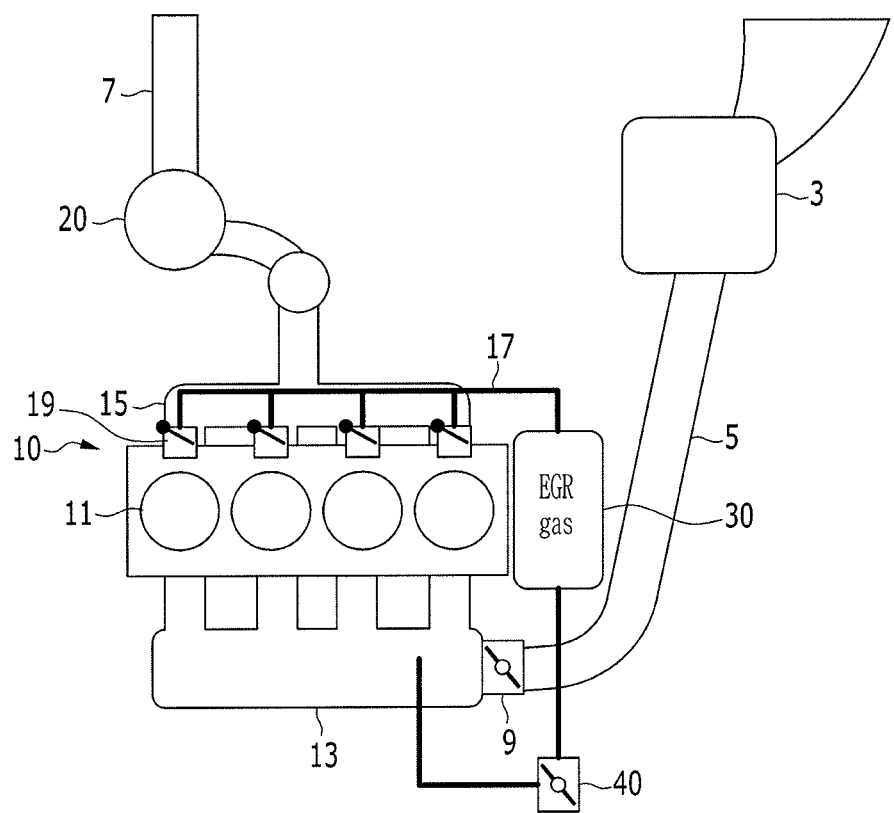
FIG. 3 is a schematic view showing an engine system according to various exemplary embodiments of the present invention.
Figure 4:
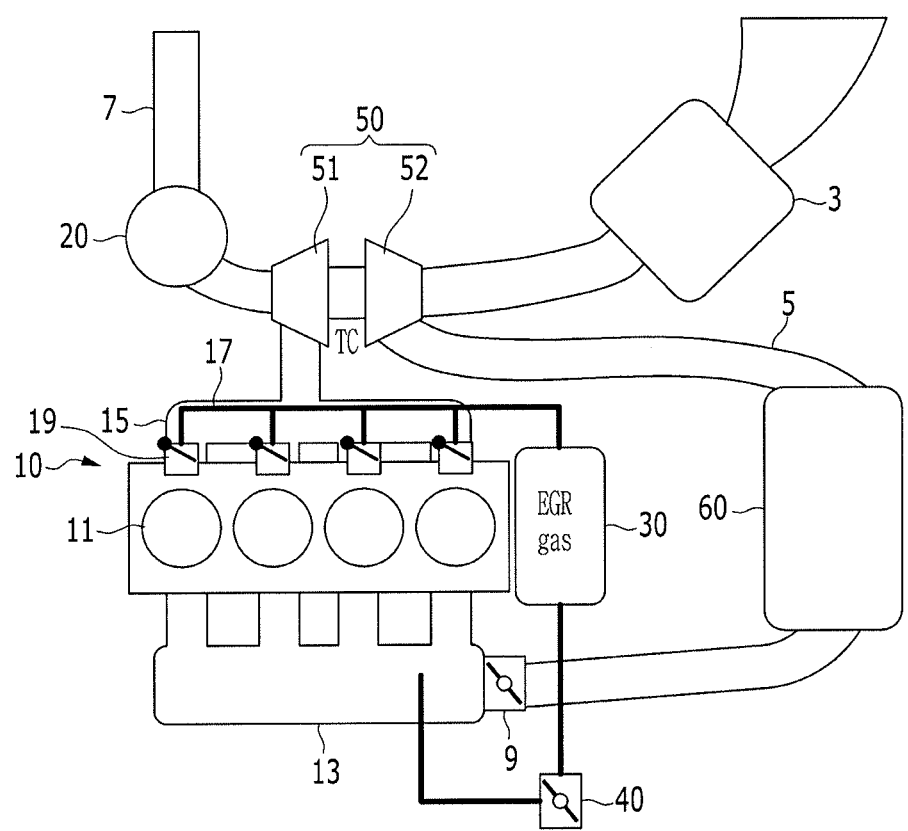
FIG. 4 is a schematic view showing an example in which a turbocharger is applied in the engine system according to the various exemplary embodiments of the present invention.

FIG. 3 is a schematic view showing an engine system according to various exemplary embodiments of the present invention, and FIG. 4 is a schematic view showing an example in which a turbocharger is applied in the engine system according to the various exemplary embodiments of the present invention.

Referring to FIG. 3 and FIG. 4, a plurality of EGR exhaust passages 17 are connected to the plurality of combustion chambers 11 on the exhaust manifold 15 side of the engine 10, and the plurality of EGR exhaust passages 17 join together and are connected to the inlet of the EGR collecting device 30.

An EGR exhaust passage check valve 19 is provided at the inlet of the plurality of EGR exhaust passages 17. The EGR exhaust passage check valve 19 may be opened or closed by a pressure difference between the intake manifold 13 and the exhaust manifold 15.

The EGR exhaust passage check valve 19 is operated by a control signal of a controller such as an ECU (Engine Control Unit) provided in the vehicle so that the pressure difference between the intake manifold 13 and the exhaust manifold 15 becomes equal to a predetermined pressure value. As such, the EGR exhaust passage check valve 19 may be controlled to be opened. Furthermore, the controller can control the EGR exhaust passage check valve 19 to be opened such that the pressure of the exhaust manifold 15 is higher than the pressure inside the EGR collecting device 30.

Furthermore, the controller can control so that only the EGR exhaust passage check valve 19 corresponding to the combustion chamber, which is the exhaust stroke among the plurality of combustion chambers 11, is opened. Furthermore, when the pressure of the combustion chamber 11, which is the exhaust stroke, is higher than the pressure inside the EGR collecting device 30, the controller can control the EGR exhaust passage check valve 19 of the corresponding combustion chamber to be opened.

The EGR gas is introduced into the EGR collecting device 30 through the EGR exhaust passage check valve 19 and the EGR exhaust passage 17 which are opened.

Although the EGR gas collecting device check valve 32 is not shown in FIG. 3 and FIG. 4, an EGR gas collecting device check valve 32 may be additionally provided at the inlet of the EGR collecting device 30 together with the EGR exhaust passage check valve 19.

Figure 5:
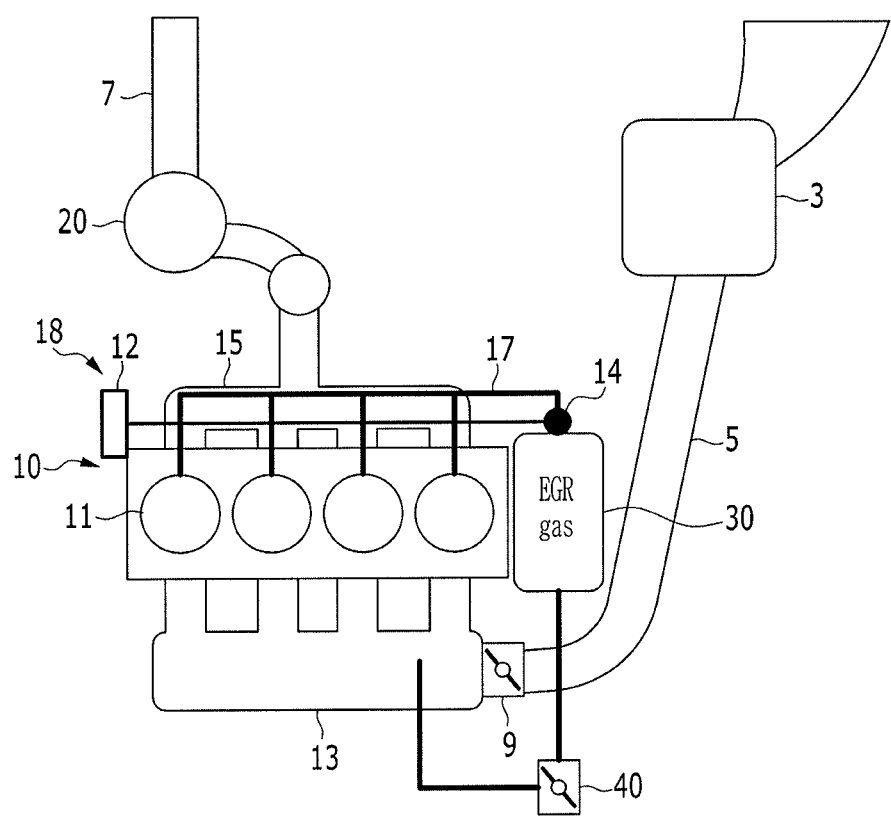
FIG. 5 is a schematic view showing an engine system according to various exemplary embodiments of the present invention.
Figure 6:
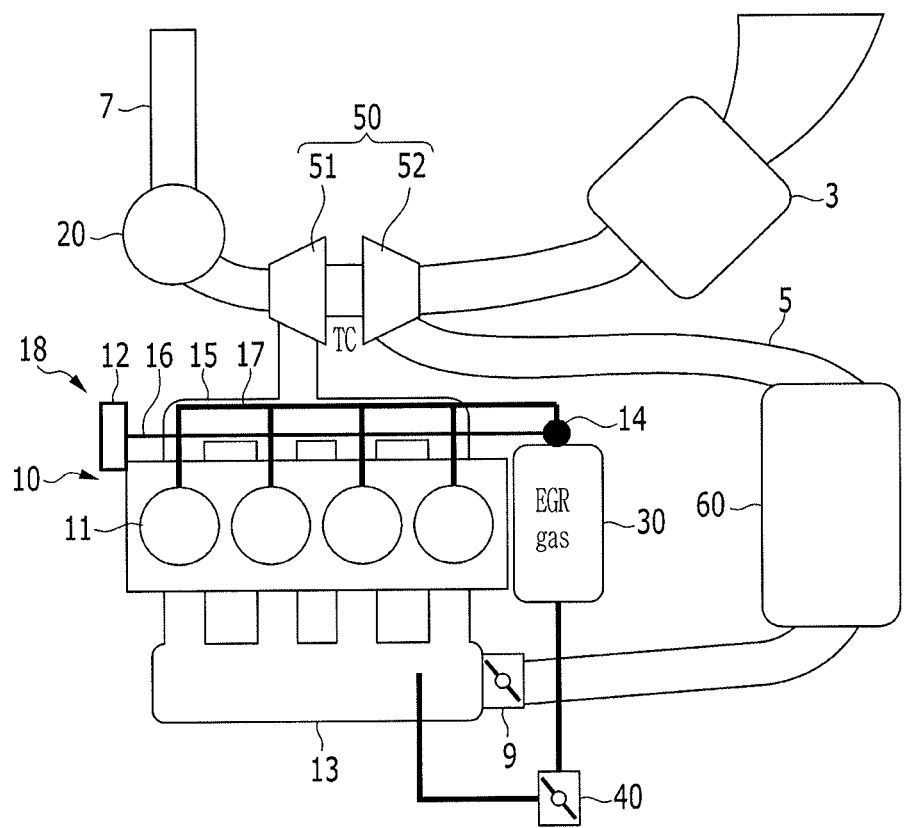
FIG. 6 is a schematic view showing an example in which a turbocharger is applied in the engine system according to the various exemplary embodiments of the present invention.

FIG. 5 is a schematic view showing an engine system according to various exemplary embodiments of the present invention, and FIG. 6 is a schematic view showing an example in which a turbocharger is applied in the engine system according to the various exemplary embodiments of the present invention.

Referring to FIG. 5 and FIG. 6, a cam drive check valve 18 synchronized with the cycle of the engine may be mounted on the exhaust manifold 15 side thereof.

The cam drive check valve 18 may be mounted to extend in the longitudinal direction of the exhaust manifold 15 and include a hollow pipe 16.

Figure 9A:
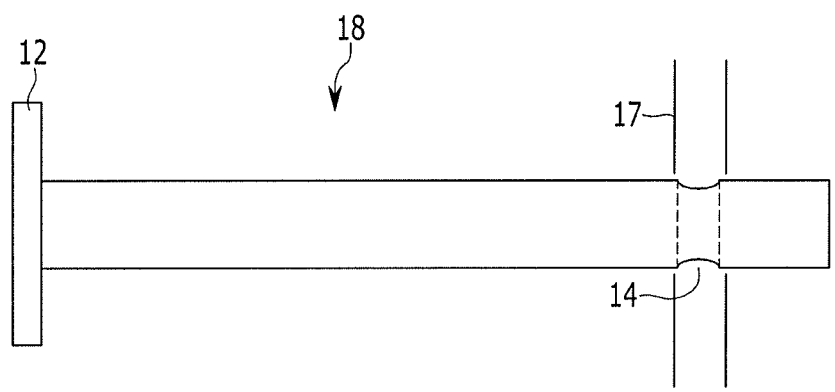
FIG. 9A and FIG. 9B are schematic views showing a cam drive check valve in an engine system according to the various exemplary embodiments of the present invention.

In an exemplary embodiment of the presently claimed invention, the hollow pipe 16 may be mounted in an inlet of the EGR collecting device 30 by penetrating the inlet of the EGR collecting device 30, as shown in FIG. 9A. The cam drive check valve 18 may also be provided with at least one through hole 14 penetrating the side wall of the hollow pipe 16.

In the engine system according to the various exemplary embodiments of the present invention, the through hole 14 formed in the cam drive check valve 18 may be formed at a position corresponding to the inlet of the EGR collecting device 30.

The cam drive check valve 18 may be provided to open and close the inlet of the EGR collecting device 30 by being rotated in synchronization with a camshaft as a cam timing chain and a belt are driven.

The cam drive check valve 18 is rotated as the cam timing chain and the belt are driven to connect the through hole 14 with the inlet of the EGR collecting device 30 when the exhaust pulsation of the engine 10 occurs, and the EGR gas may be provided to be introduced into the collecting device 30.

Figure 7:
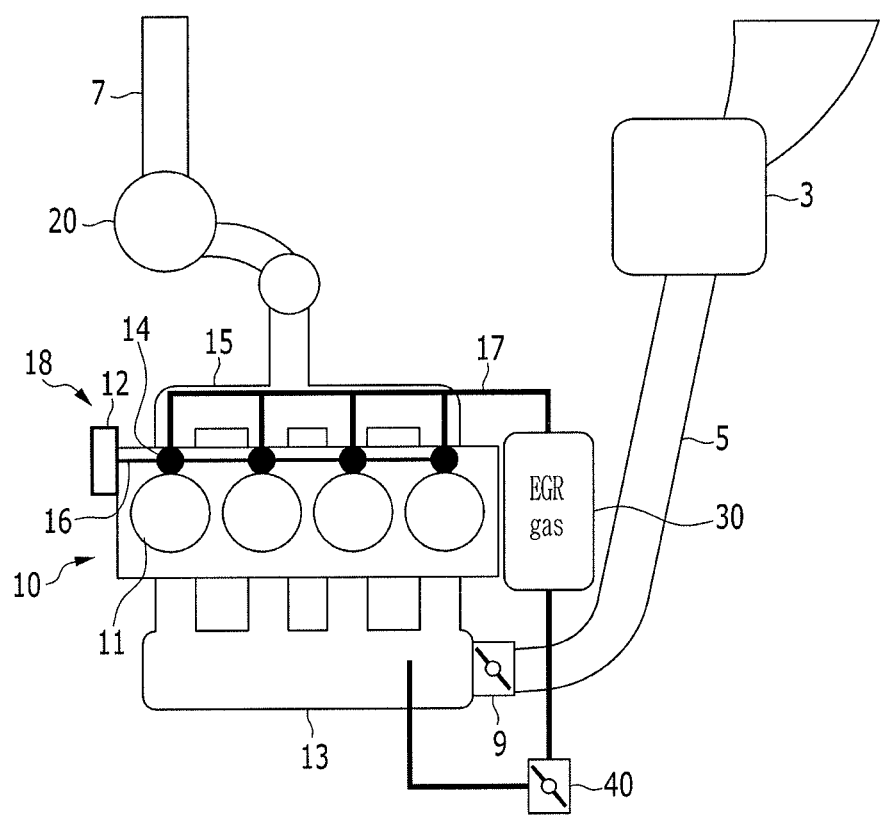
FIG. 7 is a schematic view showing an engine system according to various exemplary embodiments of the present invention.
Figure 8:
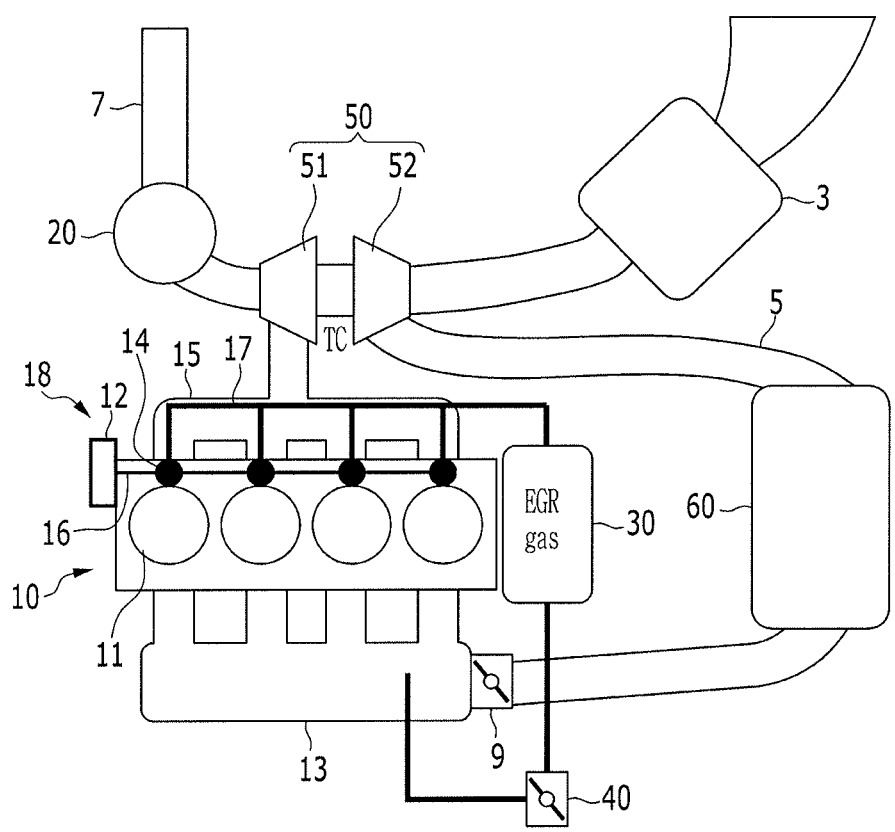
FIG. 8 is a schematic view showing an example in which a turbocharger is applied in the engine system according to the various exemplary embodiments of the present invention.
Figure 9B:
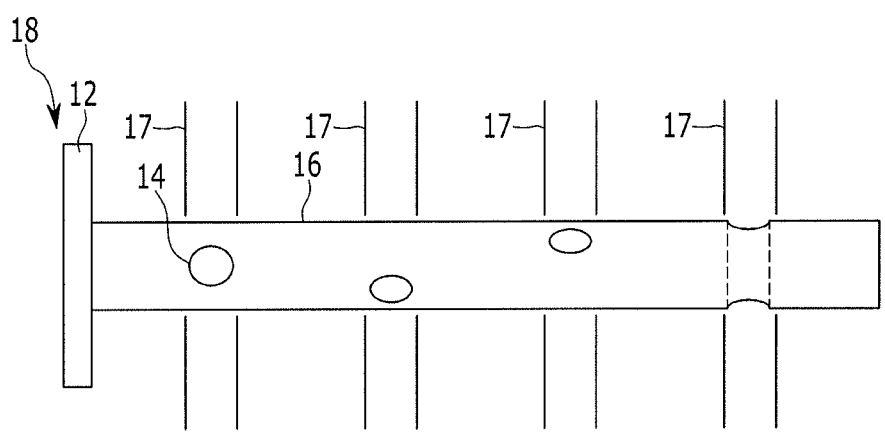

FIG. 7 is a schematic view showing an engine system according to various exemplary embodiments of the present invention, FIG. 8 is a schematic view showing an example in which a turbocharger is applied in the engine system according to the various exemplary embodiments of the present invention, and FIGS. 9A and 9B are schematic views showing a cam drive check valve in an engine system according to the various exemplary embodiments of the present invention.

Referring to FIG. 7, FIG. 8, and FIG. 9, a cam drive check valve 18 synchronized with the cycle of the engine 10 may be mounted on the exhaust manifold 15 side.

The cam drive check valve 18 may be mounted to extend in the longitudinal direction of the exhaust manifold 15 and include a hollow pipe 16.

In an exemplary embodiment of the presently claimed invention, the hollow pipe 16 may be mounted in the EGR exhaust passages 17 by penetrating the EGR exhaust passages 17 as shown in FIG. 9B.

Furthermore, the cam drive check valve 18 has a plurality of through holes 14 penetrating side walls of the hollow pipe 16 corresponding to the EGR exhaust passages 17 provided in correspondence with the combustion chamber 11 of the engine 10. The plurality of through holes 14 may be formed in order at intervals of 45° along the circumferential direction of the cam drive check valve 18. The cam drive check valve 18 includes a sprocket 12, a hollow pipe 16 extending from the sprocket 12, and a plurality of through holes 14 extending through the hollow pipe 16.

The cam drive check valve 18 may be rotated synchronously with the camshaft as the cam timing chain and the belt are driven.

The cam drive check valve 18 rotates to operate to communicate with one of the combustion chambers and the plurality of through holes in the exhaust stroke of the combustion chamber 11 so that the EGR gas flows through the EGR exhaust passage 17 connected to the combustion chamber and may be provided to flow into the EGR collecting device 30.

Like this, according to an exemplary embodiment of the present invention, by supplying the EGR gas to the engine by using the exhaust pulsation generated when the exhaust valve of the engine is opened, the EGR gas may be used in all the operating regions regardless of the differential pressure generated between the intake system of the engine and the exhaust system, so that the EGR rate and the fuel economy of the engine may be improved.

Furthermore, the length of the EGR passage compared to the existing EGR system is greatly reduced, and the EGR response may be improved.

Furthermore, it is possible to secure combustion stability by eliminating instability of engine combustion which may occur when EGR is applied.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine system, comprising:
   an engine including a plurality of combustion chambers for generating a driving force by combustion of fuel, and an intake manifold and an exhaust manifold fluidically-connected to the plurality of combustion chambers, wherein an exhaust line is connected to the exhaust manifold;
   an exhaust gas purifying device mounted in the exhaust line through which exhaust gas discharged from the plurality of combustion chambers flows;
   an exhaust gas recirculation (EGR) collecting device connected to the exhaust manifold and the intake manifold and configured for collecting a portion of the exhaust gas from the exhaust manifold of the engine and supplying the collected exhaust gas to the intake manifold of the engine;

an EGR gas supply control valve mounted between the EGR collecting device and the intake manifold and configured to regulate a flow rate of EGR gas supplied to the intake manifold; and a plurality of EGR exhaust passages branched from the plurality of combustion chambers adjacent to the exhaust manifold and coupled to an inlet of the EGR collecting device, wherein an EGR exhaust passage check valve which is opened or closed by a pressure difference between the intake manifold and the exhaust manifold is provided at an inlet of the plurality of EGR exhaust passages, and wherein the EGR exhaust passage check valve is opened when exhaust pulsation occurs, and the exhaust gas is introduced into the EGR collecting device through the plurality of EGR exhaust passages when the EGR exhaust passage check valve is opened.

2. The engine system of claim 1, further including: a turbocharger including a turbine mounted in the exhaust line upstream of the exhaust gas purifying device and rotated by the exhaust gas and a compressor mounted in an intake line connected to the intake manifold and rotating in association with the turbine.

3. The engine system of claim 2, further including:
an intercooler fluidically connected to the compressor and mounted in the intake line upstream of the intake manifold to cool air compressed by the compressor, and
a throttle valve mounted on an inlet of the intake manifold downstream the intercooler and configured to adjust an air amount supplied to the intake manifold.

4. The engine system of claim 1, wherein an inlet of the EGR collecting device is provided with an EGR gas collecting device check valve which is opened or closed by a pressure difference between the intake manifold and the exhaust manifold.

5. The engine system of claim 4, wherein the EGR gas collecting device check valve is opened when an exhaust pulsation occurs for the exhaust gas to be introduced into the EGR collecting device.

6. The engine system of claim 1, wherein a cam drive check valve synchronized with a cycle of the engine is mounted adjacent to the exhaust manifold.

7. The engine system of claim 6, wherein the cam drive check valve includes a hollow pipe extending in a longitudinal direction of the exhaust manifold.

8. The engine system of claim 7, wherein at least one through hole penetrating a side wall of the hollow pipe is formed in the cam drive check valve.

9. The engine system of claim 8, further including: a plurality of EGR exhaust passages branched from the plurality of combustion chambers adjacent to the exhaust manifold and coupled to an inlet of the EGR collecting device, wherein the hollow pipe of the cam drive check valve is mounted in the EGR exhaust passages to selectively open the EGR exhaust passages according to rotation of the hollow pipe.

10. The engine system of claim 9, wherein the cam drive check valve has a plurality of through holes passing through a side wall of the hollow pipe corresponding to the EGR exhaust passages provided corresponding to the plurality of combustion chambers.

11. The engine system of claim 10, wherein the plurality of through holes are formed in order at intervals of 45° along a circumferential direction of the cam drive check valve.

12. The engine system of claim 11, wherein the cam drive check valve rotates to operate to fluidically-communicate with one of the combustion chambers and the plurality of through holes which are exhaust strokes of the plurality of combustion chambers, and through the EGR exhaust passages connected to the combustion chambers which is the exhaust strokes, the exhaust gas flows into the EGR collecting device.

* * * * *